United States Patent [19]
Allport

[11] 3,777,987
[45] Dec. 11, 1973

[54] IRRIGATION DEVICE

[76] Inventor: Davies Allport, 966 Muirlands Vista Way, La Jolla, Calif. 92037

[22] Filed: Aug. 4, 1972

[21] Appl. No.: 277,897

[52] U.S. Cl............... 239/542, 239/547, 239/553.3
[51] Int. Cl............................................. B05b 15/00
[58] Field of Search.................. 239/145, 450, 542, 239/547, 553.3; 47/48.5

[56] References Cited
UNITED STATES PATENTS

| 2,515,600 | 7/1950 | Hayes | 239/542 X |
| 2,798,768 | 7/1957 | Babin | 239/145 X |
| 3,601,320 | 8/1971 | Du Plessis | 239/542 |
| 3,315,895 | 4/1967 | Klingbeil et al. | 239/145 |
| 3,552,654 | 1/1971 | Thomas | 239/542 X |

Primary Examiner—M. Henson Wood, Jr.
Assistant Examiner—John J. Love
Attorney—Keith D. Beecher

[57] ABSTRACT

An improved device is provided to supply irrigation water in controlled limited amounts to the root zone of plants. The device is constructed from an outer tube or pipe suitable for carrying water along which outlets are spaced as required for the particular crop being irrigated. An inner tube which may be an osmosis membrane; or which may be formed of resilient material, with spaced holes therein; is fitted inside the outer pipe in such a way that water pressure in the inner tube keeps the inner tube in contact with the inside wall of the outer pipe. The surface between the inner tube and the outer pipe is preferably textured with a pattern that provides multiple, continuous, restricted paths through which the water must flow from the inner tube to the outer pipe. The holes in the inner tube are located so that water passing from the interior of the inner tube to the outlets in the outer pipe must travel along these restricted paths. Therefore, the shape and size of the texturing and the distance the water travels along the restricted paths provide flow control of the water supplied to the plants in the limited quantities desired.

As flow control is obtained from the restricted areas, the holes in the inner tube and the outlets in the outer pipe may be relatively large and clog free. Furthermore, the resilient inner tube is of such a design that with the water turned off it will separate from the outer pipe. When turned on again, a small quantity of water flows into the textured area between the inner tube and outer pipe, and as the pressure builds up the extra water is extruded out of the outlets in the outer pipe flushing with it any solids that may tend to clog the restricted paths.

5 Claims, 5 Drawing Figures

PATENTED DEC 11 1973 3,777,987
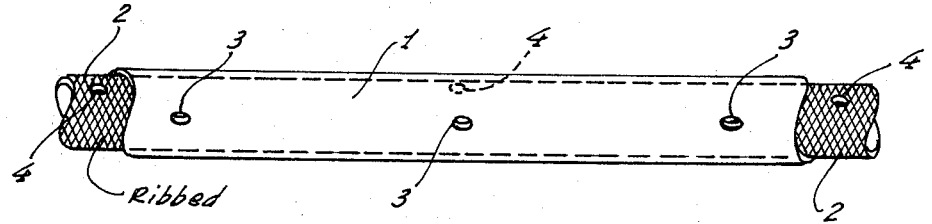
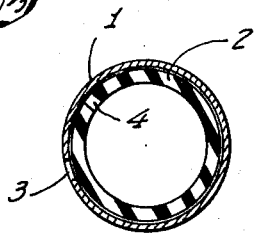
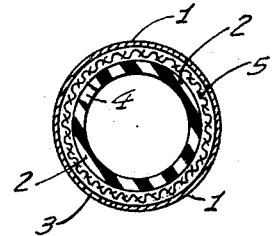
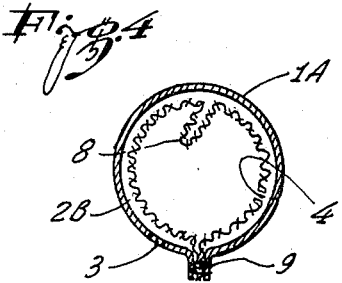
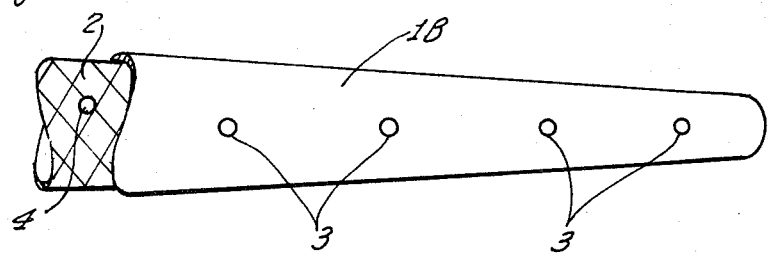

3,777,987

IRRIGATION DEVICE

BACKGROUND OF THE INVENTION

Irrigation of crops is well known and has been in use since early history. Some irrigation systems which are currently in wide use are field flooding, furrow flooding, and sprinkler systems. These methods waste water, wash away nutrients, compact the soil, aid the growth of weeds, require considerable labor to operate, and do not supply water at desirable rates. In order to reduce these problems trickle irrigation is becoming widely used.

Unlike other systems that distribute excessive water over wide areas, trickle irrigation applies water at a slow, controlled rate to the root zone of the crop. Typically this is accomplished by supplying a small water outlet that allows a limited dripping or flowing of water at 2 gallons per hour for large plants, and one-third of 1 gallon or less per hour for some row crops. As evaporation, run-off, over watering, and watering beyond the root zone is eliminated, water savings are often 50 percent or more.

Additionally, trickle irrigation benefits include savings in fertilizers and chemicals which may be applied with the water without being washed away, improved quantity and quality of crops, and fewer salt deposits in the root zone because less water is used.

The two trickle irrigation types in general use today are continuous units, and fittings. Continuous units are pipes or hoses which are made of a porous material such as a fabric that weeps, or which are made from non-porous material with water outlet holes spaced along their length. Since the pores or outlet holes in the prior art assemblies must be small in order to maintain the desirable flow rates, they tend to become clogged with silt or precipitating chemicals carried in the water.

Fittings are designed with long restricting passages through which the water must pass to the outlet. As the restricting passage is long, its cross sectional area may be larger and thus more clog resistant. Fittings, however, are more costly per water outlet than the continuous systems in use.

BRIEF DESCRIPTION OF THE DRAWINGS

FIG. 1 is a representation of a section of hose which is fitted with an inner tube in accordance with one embodiment of the invention;

FIGS. 2, 3 and 4 are cross-sectional view of various modifications of the construction of the water hose assembly of FIG. 1 in accordance with other embodiments of the invention; and FIG. 5 shows yet another embodiment of the invention.

DETAILED DESCRIPTION OF THE ILLUSTRATED EMBODIMENT

A section of outer water pipe or hose is shown in FIG. 1 and designated 1. An inner tube 2, formed of appropriate resilient material, is fitted inside the outer pipe 1 in coaxial relationsip, so as to have contact between the inner surface of the outer pipe 1 and the outer surface of the inner tube 2. The outer surface of the inner tube 2 or the inner surface of the outer hose, or both surfaces, are roughened or textured, or a textured member, such as a fabric may be inserted between the inner tube 2 and outer hose 1 (FIG. 2), so as to provide a matrix of interconnected voids between the two surfaces.

A series of outlets 3 are provided along the outer pipe 1, and a series of holes 4 are provided along the inner tube 2. Each of the inner tube holes 4 is displaced a predetermined distance from a corresponding outlet 3. As explained above, the inner tube may be of an osmosis membrane if so desired.

As water under pressure is passed down the interior of the inner tube 2, it expands the inner tube radially against the inner surface of the outer pipe, and the water passes through the holes 4 into the matrix of interconnecting voids between the adjacent surfaces of the inner tube 2 and the outer pipe 1 until it reaches the outlets 3 in the outer pipe and passes through the outlets to the crop being irrigated. As the size and shape of the voids between the adjacent surfaces of the inner tube 2 and outer hose 1 control the flow of water, the holes 4 and outlets 3 may be reasonably large for they do not perform the function of controlling the flow of irrigating water.

The flow controlling voids between the adjacent surfaces of the inner tube 2 and outer hose 1 are manufactured in such a way that there are paths for the water to take from any one of the holes 4 in the inner tube to an adjacent outlet 3 in the outer pipe. Silt in the water could clog enough of the restricted passages adversely to affect the flow rate. With the inner tube 2 resiliently constructed so as to pull away from the outer pipe 1 when the water is turned off, the clogging silt is released. When the water is again turned on, some water flows through the holes 4 into the space between the surfaces and as water pressure builds up, the water is trapped and extruded out of the outlets 3. Thus the restricted passages are automatically flushed.

FIG. 3 shows a cross sectional view of the outer hose 1 fitted with a flexible inner tube 2 which is of such material that it falls away from the hose 1 when not in use, but it is held against the inner surface of the hose 1 by water pressure when in use.

The sectional view in FIG. 4 shows a texture inner tubular member 2B composed, for example, of suitable fabric; and an outer pipe 1A made from flat sheet stock rolled into a tubular shape and sealed along a common seam 9. The holes 4 in the inner tubular member 2B are located on one side of the common seam 9, and the outlets 3 in the outer pipe 1 are located on the other side of the common seam 9, so that the water passing through the holes 4 must take the long path around the outer surface of the inner tubular member to the outlets 3. The inner tubular member 2B is produced with an excess of material stored in fold 8. Such excessive material aids manufacturing for it eliminates the necessity of matching the outside diameter of the inner tubular member 2B and the inside diameter of pipe 1A.

The embodiment of FIG. 5 is generally similar to the embodiment of FIG. 1, except that the hose 1B in FIG. 5 has a diminishing diameter, as shown. It is evident that other shapes are feasible.

It will be appreciated, of course, that while particular embodiments of the invention have been shown and described, modifications may be made. It is intended in the following claims to cover all modifications which come within the spirit and scope of the invention.

What is claimed is:

1. An assembly for distributing irrigation water, and the like, in controlled amounts, comprising: an outer tubular member having outlets located at spaced distances along its length; an inner tubular member coaxial with said outer tubular member, said inner tubular member being formed of deformable material and having holes located at spaced distances along its length and through which water may pass, the outer surface of said inner tubular member being displaced radially outwardly toward the inner surface of said outer tubular member by water pressure in said inner tubular member to cause said inner tubular member to contact the inner surface of said outer tubular member so as to provide a surface contact between the outer surface of said inner tubular member and said inner surface of said outer tubular member, and at least one of the contacting surfaces being textured in a way to produce a plurality of interconnecting restricted passages between the holes in said inner tubular member and said outlets in said outer tubular member, so as to allow water from said inner tubular member to pass through the holes therein and to enter the restricted passages and seep between said contacting surfaces to the outlets in said outer tubular member.

2. The assembly defined in claim 1, in which said inner tubular member is formed of a resilient material.

3. The assembly defined in claim 1, in which said inner tubular member is formed of a flexible material normally having an outer diameter greater than the inner diameter of said outer tubular member and having a longitudinal fold therein.

4. The assembly defined in claim 1, in which the inner tubular member is attached to said outer tubular member along a longitudinal seam.

5. The assembly defined in claim 1, and which includes a separate textured tubular member interposed between said inner tubular member and said outer tubular member.

* * * * *